(12) United States Patent
Yu (10) Patent No.: US 8,579,524 B2
(45) Date of Patent: Nov. 12, 2013

(54) ASSEMBLY FOR SUPPORTING PHOTOGRAPHING APPARATUS

(75) Inventor: Byung-uook Yu, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 154 days.

(21) Appl. No.: 13/222,626

(22) Filed: Aug. 31, 2011

(65) Prior Publication Data
US 2012/0308222 A1 Dec. 6, 2012

(30) Foreign Application Priority Data
May 30, 2011 (KR) .................. 10-2011-0051665

(51) Int. Cl.
*G03B 17/00* (2006.01)
(52) U.S. Cl.
USPC .................................................. 396/427
(58) Field of Classification Search
USPC .................................................. 396/427
See application file for complete search history.

(56) References Cited

U.S. PATENT DOCUMENTS

| 8,186,638 | B2 * | 5/2012 | Nishida et al. | 248/292.12 |
| 8,317,414 | B2 * | 11/2012 | Jones | 396/427 |
| 2006/0185460 | A1 * | 8/2006 | Shiino et al. | 74/422 |
| 2008/0223163 | A1 * | 9/2008 | Yamazaki et al. | 74/422 |
| 2011/0084820 | A1 * | 4/2011 | Walter et al. | 340/426.24 |
| 2012/0152638 | A1 * | 6/2012 | Sultan et al. | 180/272 |

FOREIGN PATENT DOCUMENTS

| JP | 10-206964 A | 8/1998 |
| JP | 2005-241909 A | 9/2005 |
| JP | 2010-11199 A | 1/2010 |
| KR | 10-1999-0042878 A | 6/1999 |

* cited by examiner

*Primary Examiner* — Clayton E Laballe
*Assistant Examiner* — Dennis Hancock
(74) *Attorney, Agent, or Firm* — Sughrue Mion, PLLC (57) ABSTRACT

An assembly for supporting a photographing apparatus includes a first supporting member on which a photographing apparatus and a rotation shaft are installed, a second supporting member that supports the first supporting member such that the first supporting member is able to rotate around the rotation shaft, a driving unit that rotates the rotation shaft, a pinion installed on the rotation shaft, a rack gear engaging with the pinion, and at least one elastic member that applies elastic force to the rack gear.

20 Claims, 9 Drawing Sheets

ASSEMBLY FOR SUPPORTING PHOTOGRAPHING APPARATUS

RELATED APPLICATIONS

This application claims the benefit of Korean Patent Application No. 10-2011-0051665, filed on May 30, 2011, in the Korean Intellectual Property Office, the disclosure of which is incorporated herein, by reference, in its entirety.

BACKGROUND

1. Field

One or more embodiments relate to an assembly for supporting a photographing apparatus.

2. Description of the Related Art

Photographing apparatuses are widely used. Such apparatuses include not only personal photographing apparatuses, such as digital cameras, but also monitoring photographing apparatuses, such as surveillance cameras used in vehicle parking areas, and the like.

Generally, a monitoring photographing apparatus is installed at a particular location, such as a roadside, a ceiling of a surveillance area, etc. Here, for improved monitoring capability, rotation functions may be added to a monitoring photographing apparatus to increase the photographing angle.

Rotation functions of a monitoring photographing apparatus may include tilting and panning. Generally, tilting refers to changing a photographing angle by rotating a photographing apparatus in a plane vertical to the ground, whereas panning refers to changing a photographing angle by rotating a photographing apparatus in a plane horizontal to the ground.

As various technologies are being continuously developed with respect to monitoring photographing apparatuses, technologies for realizing tilting and panning of monitoring photographing apparatuses are also being continuously developed.

SUMMARY

One or more exemplary embodiments provide an assembly for supporting a photographing apparatus, the assembly being capable of reducing the load on the motor, during rotation.

According to an aspect of an exemplary embodiment, there is provided an assembly for supporting a photographing apparatus, the assembly including: a first supporting member on which a photographing apparatus and a rotation shaft are installed; a second supporting member that supports the first supporting member such that the first supporting member is able to rotate around the rotation shaft; a driving unit that rotates the rotation shaft; a pinion installed on the rotation shaft; a rack gear installed so as to engage the pinion; and at least one elastic member that applies elastic force to the rack gear.

The second supporting member may be located below the first supporting member.

The rotation shaft may be a shaft for a tilting operation.

A sensor bar may be installed on the rotation shaft, and a sensor for sensing the proximity of the sensor bar may be installed on the second supporting member.

The driving unit may include: a motor and a power transmission unit that transmits power from the motor to the rotation shaft.

A guiding unit may be installed on the second supporting member. A guiding hole, into which the guiding unit may be inserted, may be formed in the rack gear.

The elastic member may be placed on the guiding unit.

The rack gear, the guiding unit, and the elastic member may be assembled as a module.

The elastic member may include two elastic members, and the two elastic members may be arranged with the rack gear interposed therebetween.

The elastic members may have different lengths.

The elastic member may be formed of coil spring.

BRIEF DESCRIPTION OF THE DRAWINGS

The above and/or other aspects will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are described below, by referring to the figures, merely to explain aspects of the present description.

Figure 1:
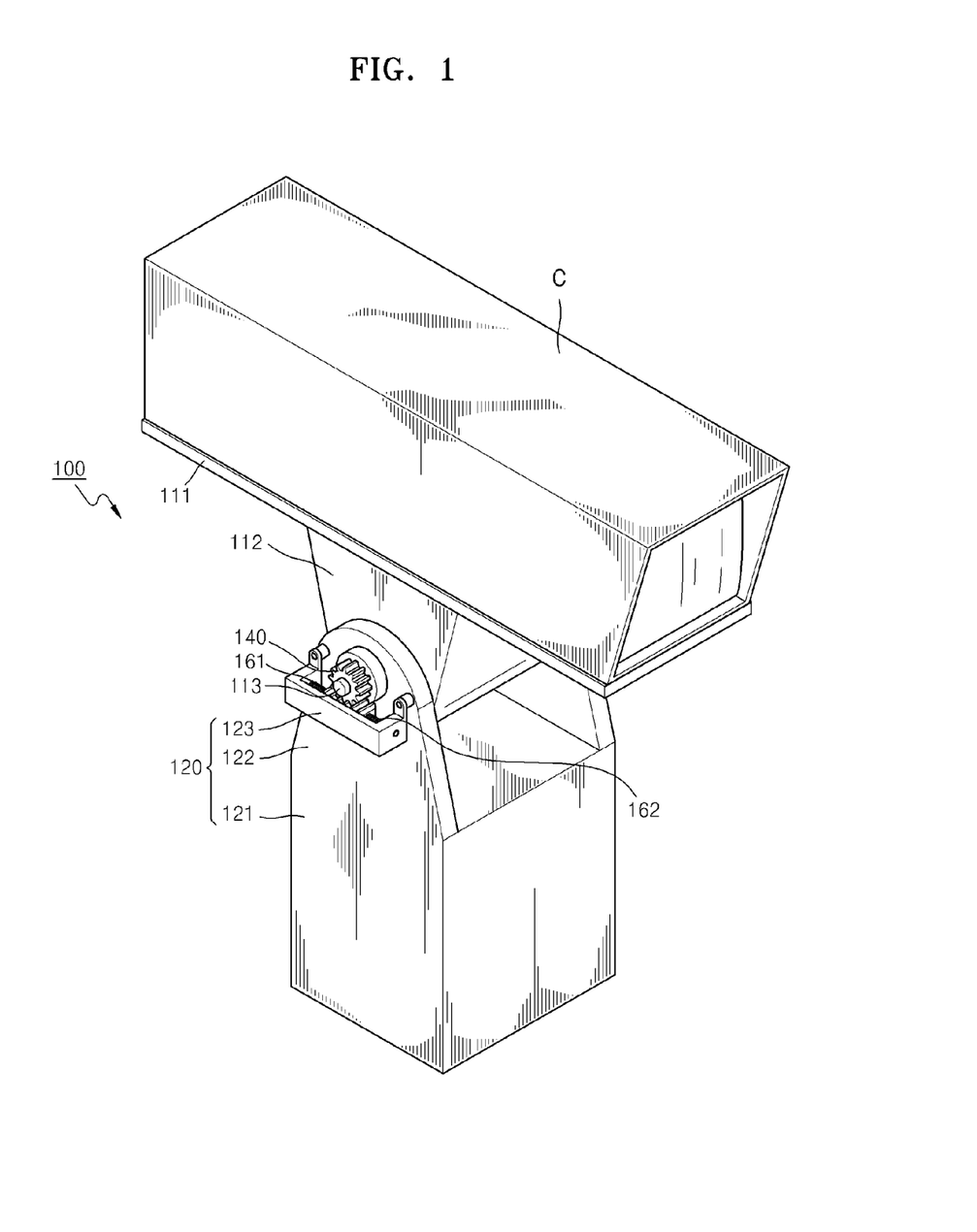
FIG. 1 is a schematic perspective view of an assembly for supporting a photographing apparatus according to an exemplary embodiment.
Figure 2:
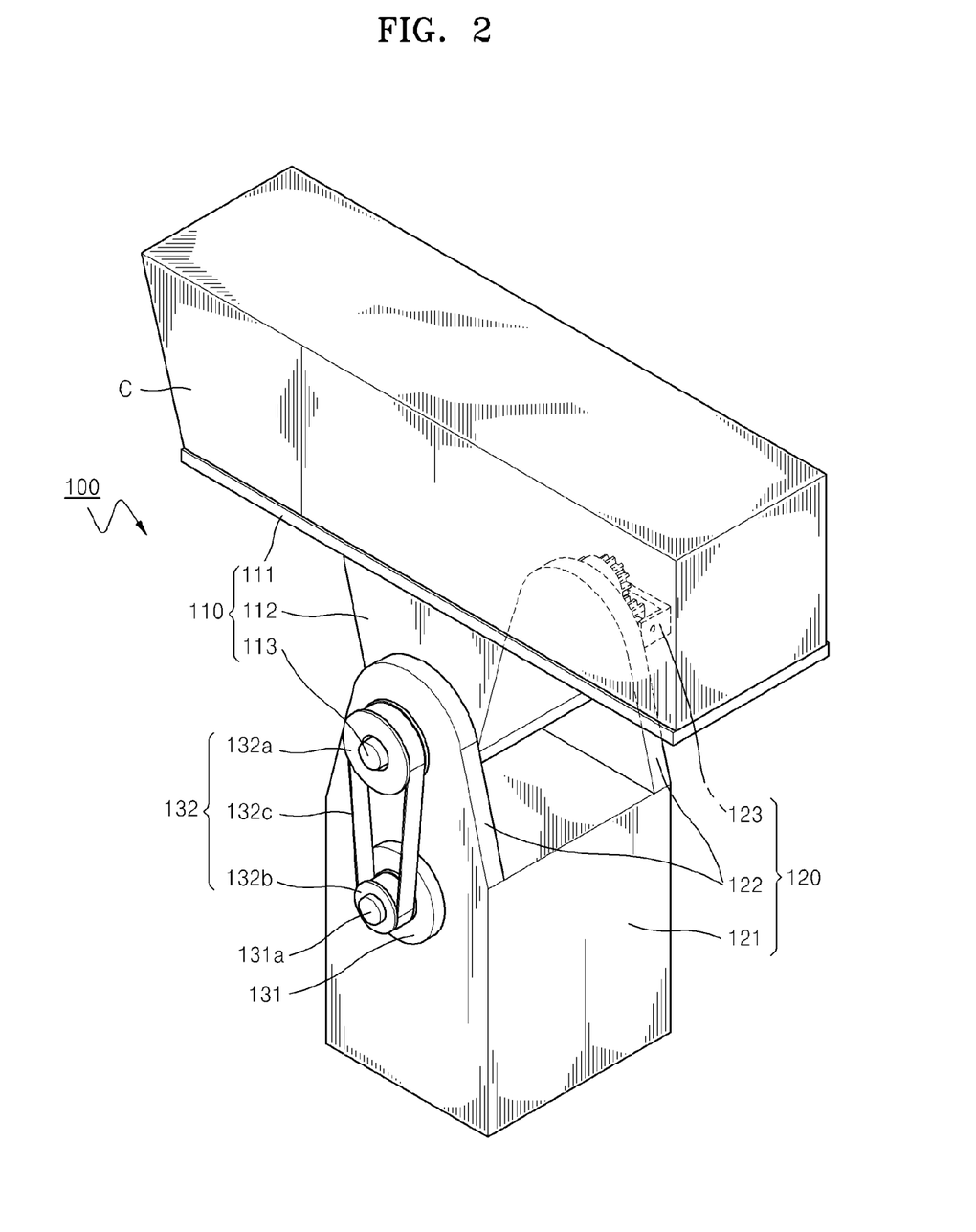
FIG. 2 is a schematic perspective view of a rear side of the assembly for supporting a photographing apparatus shown in FIG. 1.
Figure 3:
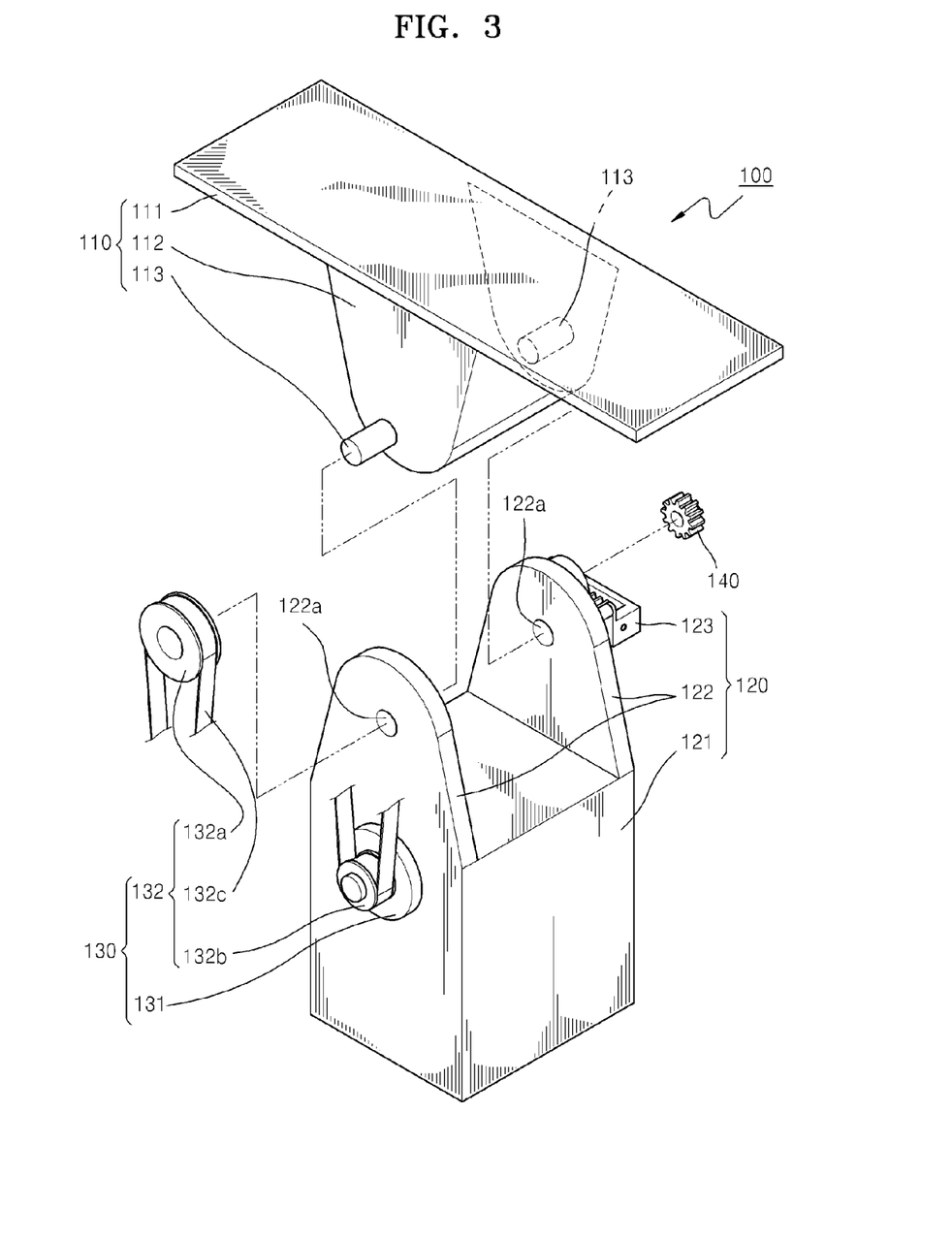
FIG. 3 is an exploded perspective view showing a combination relationship between a first supporting member and a second supporting member of an assembly for supporting a photographing apparatus according to an exemplary embodiment.
Figure 4:
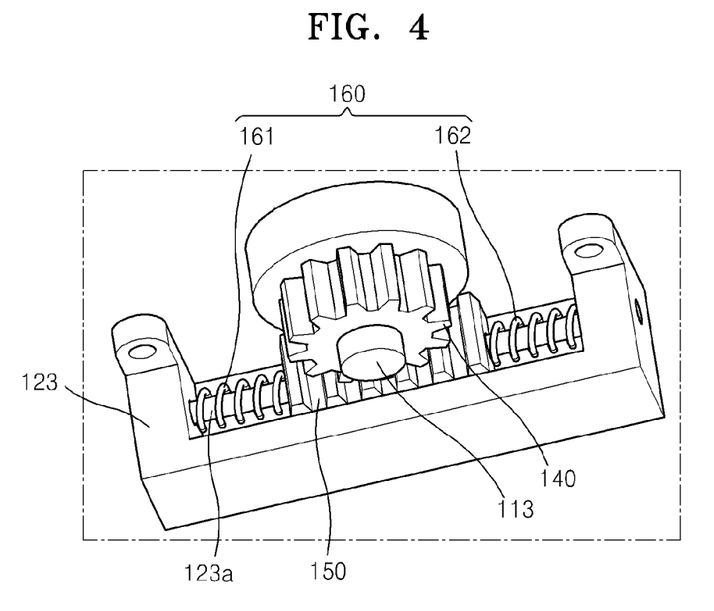
FIG. 4 is a magnified perspective view of an assembly of a pinion, a rack gear, an elastic member, and a rack gear installation portion according to an exemplary embodiment.
Figure 5:
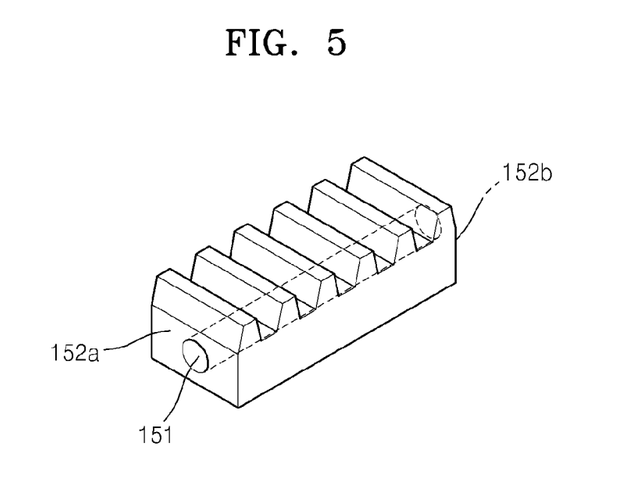
FIG. 5 is a schematic perspective view of a rack gear for an assembly for supporting a photographing apparatus according to an exemplary embodiment.
Figure 6:
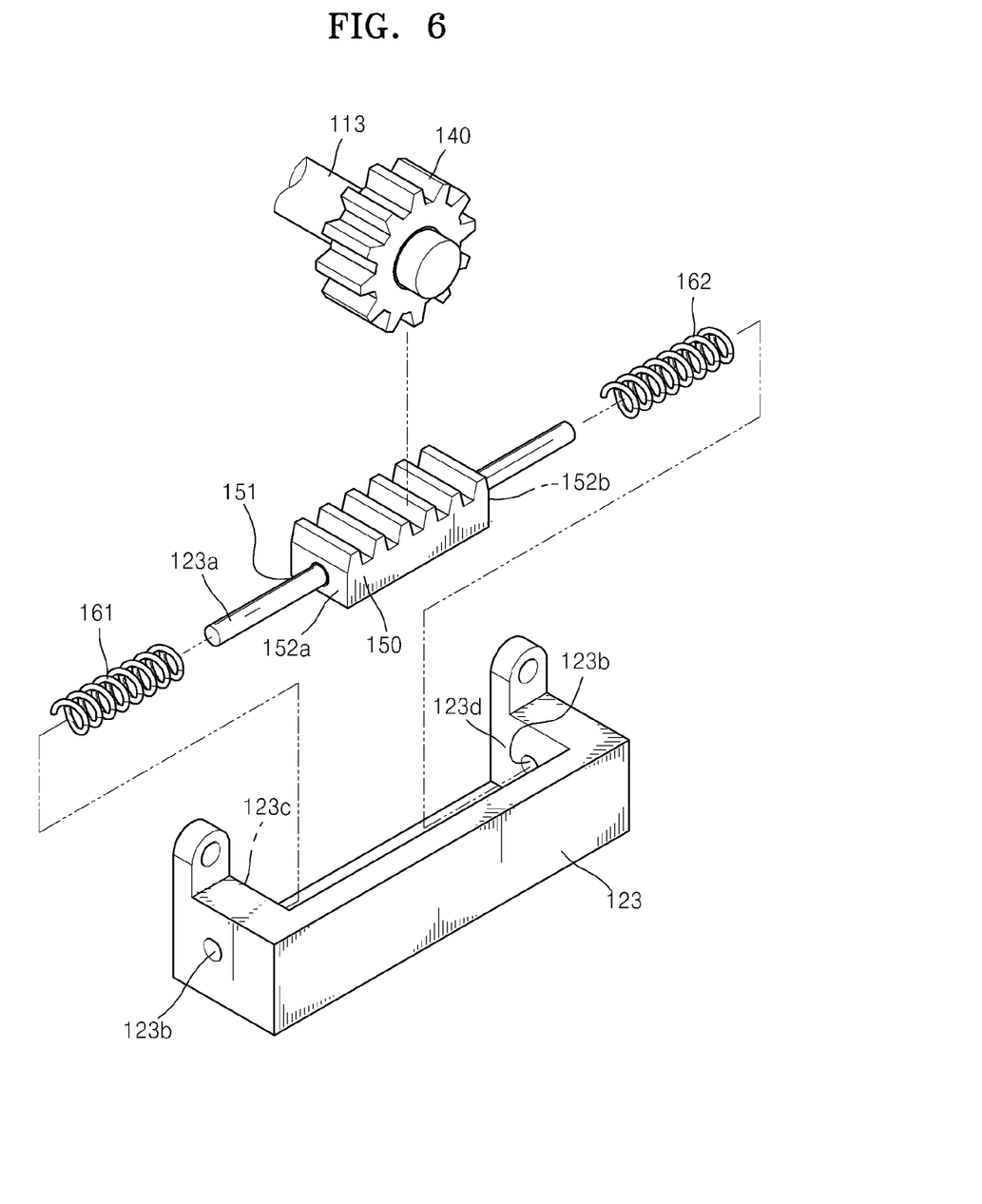
FIG. 6 is an exploded perspective view of a pinion, a rack gear, an elastic member, and a rack gear installation portion of an assembly for supporting a photographing apparatus according to an exemplary embodiment.

FIG. 1 is a schematic perspective view of an assembly for supporting a photographing apparatus according to an exemplary embodiment. FIG. 2 is a schematic perspective view of a rear side of the assembly for supporting a photographing apparatus shown in FIG. 1. FIG. 3 is an exploded perspective view showing a combination relationship between a first supporting member and a second supporting member of an assembly for supporting a photographing apparatus according to an exemplary embodiment. FIG. 4 is a magnified perspective view of an assembly of a pinion, a rack gear, an elastic member, and a rack gear installation portion. FIG. 5 is a schematic perspective view of a rack gear for an assembly for supporting a photographing apparatus according to an exemplary embodiment. FIG. 6 is an exploded perspective view of a pinion, a rack gear, an elastic member, and a rack gear installation portion of an assembly for supporting a photographing apparatus according to an exemplary embodiment.

As shown in FIGS. 1 through 6, an assembly for supporting a photographing apparatus 100 includes a first supporting member 110, a second supporting member 120, a driving unit 130, a pinion 140, a rack gear 150, and an elastic member 160.

The first supporting member 110 includes a photographing apparatus installation portion 111, a supporting portion 112, and a rotation shaft 113.

The photographing apparatus installation portion 111 has a plate-like shape, and a photographing apparatus C is fixed and installed onto the photographing apparatus installation portion 111.

The supporting portion 112 is arranged below the photographing apparatus installation portion 111 and supports the photographing apparatus installation portion 111.

The rotation shaft 113 is a shaft for a tilting operation and is formed below the supporting portion 112. Here, the rotation shaft 113 is inserted to a hole 122a formed in a shaft supporting portion 122 of the second supporting member 120, so that the first supporting member 110 may rotate around the rotation shaft 113.

Though the present exemplary embodiment employs a journal bearing structure in which the rotation shaft 113 is inserted to the hole 122a to form a rotation structure, the inventive concept is not limited thereto. For example, a rolling bearing, such as a ball bearing, may be used between the rotation shaft 113 and the hole 122a according to another exemplary embodiment.

The second supporting member 120 is arranged below the first supporting member 110 and rotatably supports the first supporting member 110.

The second supporting member 120 includes a base portion 121, the shaft supporting portion 122, and a rack gear installation portion 123.

The base portion 121 is a portion for supporting the entire assembly for supporting a photographing apparatus 100 and is located below the shaft supporting portion 122.

Although the base portion 121 according to the present exemplary embodiment fixedly supports the shaft supporting portion 122, the inventive concept is not limited thereto. For example, a base portion according to another exemplary embodiment may have a panning function for horizontally rotating the shaft supporting portion 122.

The shaft supporting portion 122 is installed on the base portion 121, and more specifically, a pair of the shaft supporting portions 122 may be installed on the base portion 121 to face each other.

The hole 122a is formed in the shaft supporting portion 122 for the rotation shaft 113 of the first supporting member 110 to be inserted thereto.

The rack gear installation portion 123 is installed on a side surface of the shaft supporting portion 122, and the rack gear 150 and the elastic member 160 are installed on the rack gear installation portion 123. The rack gear 150 is therefore supported by a portion of the second supporting member 120.

Although the rack gear installation portion 123 is arranged on a side surface of the shaft supporting portion 122, the inventive concept is not limited thereto. In other words, as long as the rack gear installation portion 123 is installed on the second supporting member 120, there is no particular limitation. For example, the rack gear installation portion 123 according to an exemplary embodiment may be installed on the base portion 121.

As shown in FIG. 6, a guiding unit 123a is installed on the rack gear installation portion 123, and the guiding unit 123a has a rod-like shape or a beam-like shape. The guiding unit 123a is installed on the rack gear installation portion 123 as two opposite ends of the guiding unit 123a are inserted into and fixed by installation holes 123b formed at two opposite ends of the rack gear installation portion 123.

The guiding unit 123a is inserted into a guiding hole 151 of the rack gear 150, and not only guides a sliding motion of the rack gear 150, but also prevents the elastic member 160 from being detached from the rack gear installation portion 123. Detailed descriptions thereof will be given below.

Inner surfaces 123c and 123d of two opposite ends of the rack gear installation portion 123 are portions to which force is applied when ends of the elastic member 160 contact the inner surfaces 123c and 123d.

Meanwhile, the driving unit 130 rotates the rotation shaft 113. As shown in FIGS. 2 and 3, the driving unit 130 includes a motor 131 and a power transmission unit 132.

The motor 131 may be a step motor, which provides the advantage of simplified control. The motor 131 is not limited to a step motor, and may be a servo motor, a direct current (DC) motor, an alternating current (AC) motor, etc.

A belt transmission device is shown as being used for the power transmission unit 132. For example, the power transmission unit 132 includes two pulleys 132a and 132b and a belt 132c.

The pulley 132a is inserted to an end of the rotation shaft 113, whereas the pulley 132b is inserted to a shaft 131a of the motor 131.

When electricity is supplied by a control unit (not shown), the shaft 131a of the motor 131 and the pulley 132b rotate, and power is transmitted to the rotation shaft 113 via the belt 132c and the pulley 132a.

Although a belt transmission device is illustrated for use as the power transmission unit 132 according to the present exemplary embodiment, the inventive concept is not limited thereto. In other words, there is no particular limitation in the type of power transmission unit, according to the present invention. For example, a gear transmission device, a chain transmission device, a rope transmission device, etc., may be used as a power transmission unit according to another exemplary embodiment.

The pinion 140 is provided at another end of the rotation shaft 113, and, as shown in FIG. 4, the pinion 140 is arranged to be engaged with the rack gear 150.

Teeth are formed on top of the rack gear 150, with which the rack gear 150 is engaged with the pinion 140. The rack gear 150 is installed in the rack gear installation portion 123.

As shown in FIG. 5, the guiding hole 151 is formed in the rack gear 150, and the guiding unit 123a is inserted to the guiding hole 151. Since an inner diameter of the guiding hole 151 is slightly larger than a diameter of the guiding unit 123a, the rack gear 150 may slide along the guiding unit 123a.

In the present exemplary embodiment, the guiding unit 123a is installed on the rack gear installation portion 123, and the guiding hole 151 is formed in the rack gear 150 for the guiding unit 123a to be inserted into the guiding hole 151. Therefore, the guiding unit 123a guides a sliding motion of the rack gear 150. However, the inventive concept is not limited thereto. In other words, a configuration for guiding a sliding motion of a rack gear according to the inventive concept is not limited to the configuration of the present exemplary embodiment. In other exemplary embodiments, any configuration may be employed as long as the corresponding configuration is capable of guiding a sliding motion of a rack gear. For example, a sliding motion of the rack gear 150 may be guided by forming a sliding groove in the rack gear installation portion 123 in a lengthwise direction and installing the rack gear 150 by inserting the rack gear 150 into the sliding groove.

Working surfaces 152a and 152b at the two opposite ends of the rack gear 150 contact the elastic member 160 and receive elastic force from the elastic member 160. Detailed descriptions thereof will be given below.

Meanwhile, the elastic member 160 reduces load of the motor 131 by applying elastic force to the rack gear 150 when the first supporting member 110 is returning to a not-tilted state from a tilted state.

The elastic member 160 is formed of a coil spring and is arranged on the rack gear installation portion 123 in a direction in which the rack gear 150 moves. The elastic member 160 includes a first elastic member 161 and a second elastic member 162 having the same length and the same spring constant.

The first elastic member 161 and the second elastic member 162 are arranged with the rack gear 150 interposed therebetween, and the first elastic member 161 and the second elastic member 162 are respectively placed on the guiding unit 123a. When the first elastic member 161 and the second elastic member 162 are arranged on the rack gear installation portion 123, the first elastic member 161 and the second elastic member 162 may be set to be slightly compressed, and thus elastic force is applied to the working surfaces 152a and 152b of the rack gear 150. As a result, the rack gear 150 may continuously move with little backlash.

Although the elastic member 160 according to the present exemplary embodiment is formed of a cylindrical coil spring, the inventive concept is not limited thereto. For example, the elastic member 160 may be formed of any of various coil springs. For example, a coil spring constituting an elastic member according to another exemplary embodiment may be a cone type coil spring, an hourglass coil spring, etc. Generally, a coil spring has superior durability and longer lifespan than a torsion spring.

The elastic member 160 according to the present exemplary embodiment is formed of the first elastic member 161 and the second elastic member 162, and thus the elastic member 160 according to the present exemplary embodiment includes two springs. However, the inventive concept is not limited thereto. For example, an elastic member according to another exemplary embodiment may be formed of one spring.

Although the first elastic member 161 and the second elastic member 162 have the same configuration in the present exemplary embodiment, the inventive concept is not limited thereto. In other words, the first elastic member 161 and the second elastic member 162 may have different configurations. For example, the first elastic member 161 and the second elastic member 162 may have different spring constants and/or different lengths. Particularly, in a case where a maximum forward tilt of the first supporting member 110 and a maximum backward tilt of the first supporting member 110 are different, the lengths of the first elastic member 161 and the second elastic member 162 may differ from each other to correspond to the maximum forward tilt and the maximum backward tilt for efficient reduction of load of the motor 131.

Furthermore, in the present exemplary embodiment, some parts may be assembled and manufactured as a single module for easy maintenance and easy replacement. For example, a module including the rack gear 150, the guiding unit 123a, and the elastic member 160 may be manufactured for easy maintenance and easy replacement in the future. In this case, if problems such as wear-off of the rack gear 150, break of the elastic member 160, etc., occur, a user may easily repair a broken module by replacing the broken module with a replacement module including the rack gear 150, the guiding unit 123a, and the elastic member 160.

Figure 7:
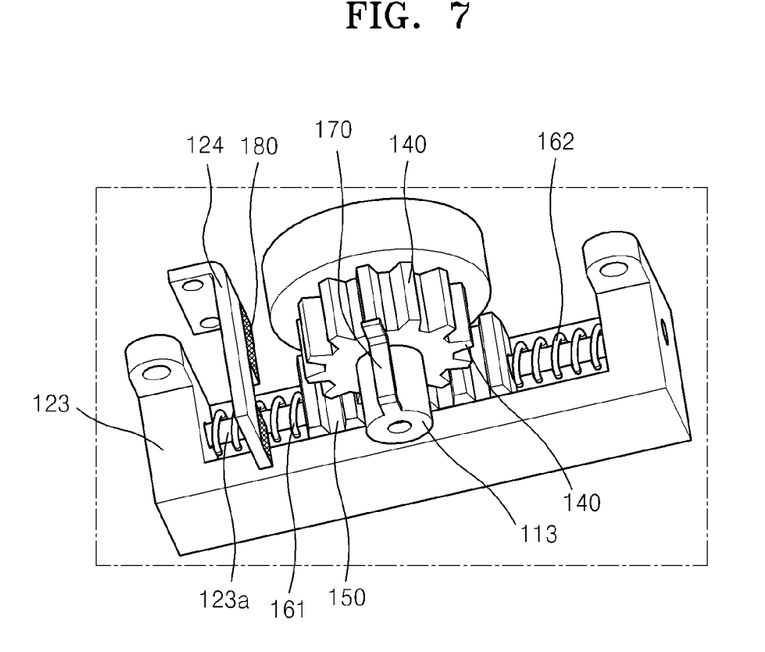
FIG. 7 is a magnified perspective view of an assembly of a pinion, a rack gear, an elastic member, a rack gear installation portion, a sensor bar, and a sensor according to another exemplary embodiment.

Meanwhile, as shown in FIG. 7, a sensor bar 170 may be additionally installed on the other end of the rotation shaft 113 according to the present exemplary embodiment. Furthermore, a sensor 180 may be installed on a sensor mounting unit 124 installed on the second supporting member 120. In this case, the sensor 180 may detect proximity of the sensor bar 170, and thus a rotation angle of the rotation shaft 113 may be measured. If such a rotation angle measuring system is employed, rotation angles measured thereby may be used to help with the operations of a control unit (not shown) that controls the motor 131. Here, the sensor 180 may be a magnetic proximity sensor, a photo sensor, etc.

Hereinafter, referring to FIGS. 8 through 10, operations of the assembly for supporting a photographing apparatus 100 according to an exemplary embodiment will be described. For convenience of explanation, a state at which the first supporting member 110 is horizontal will be referred to as a 'reference position.' At the reference position, the motor 131 does not operate, and elastic forces of the first elastic member 161 and the second elastic member 162 are balanced, and thus the rack gear 150 does not move.

Although the state at which the rack gear 150 does not move due to balanced elastic forces of the first elastic member 161 and the second elastic member 162 and the first supporting member 110 is horizontal is referred to as the 'reference position' in the present exemplary embodiment, this is simply to provide for convenience in the explanation, the inventive concept is not limited thereto. In other words, according to another exemplary embodiment, the first supporting member 110 may, in the 'reference position,' be in a position other than horizontal, such as a position in which it is slightly sloped. Even in this case, elastic forces of the first elastic member 161 and the second elastic member 162 may be balanced as much as possible, so that the rack gear 150 does not move.

Figure 8:
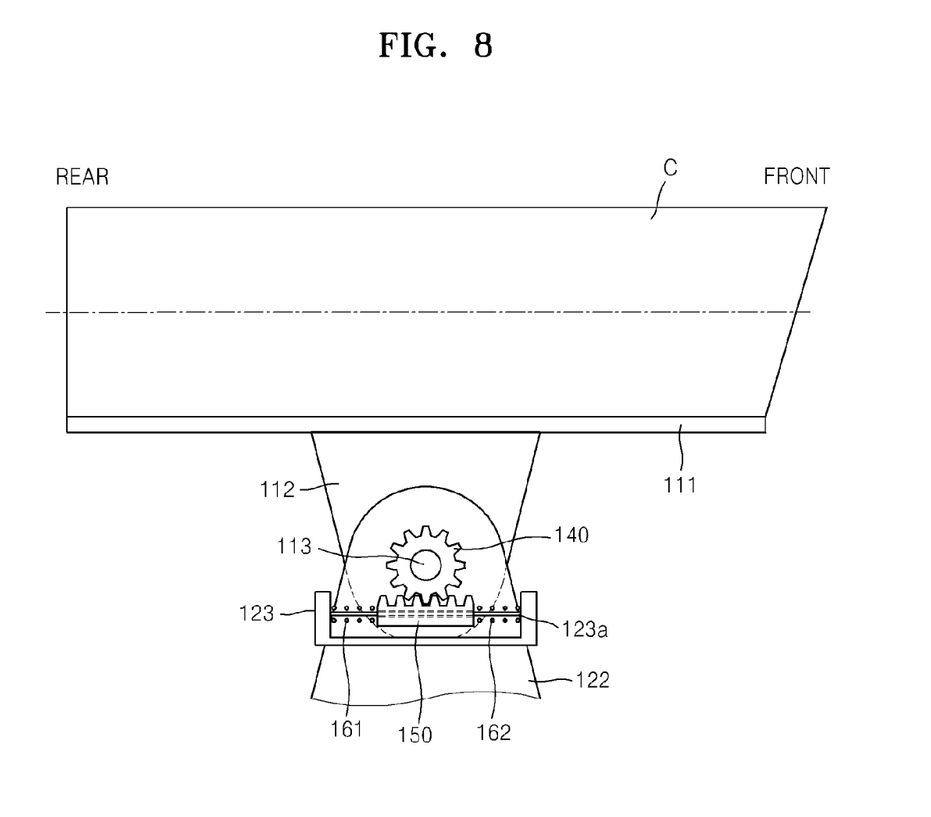
FIG. 8 is a schematic view showing a reference position at which a first supporting member of an assembly for supporting a photographing apparatus according to an exemplary embodiment is not sloped.

FIG. 8 is a schematic view showing a reference position at which a first supporting member of an assembly for supporting a photographing apparatus according to an exemplary embodiment is not sloped. FIG. 9 is a schematic view showing a state at which a first supporting member of an assembly for supporting a photographing apparatus according to an exemplary embodiment is sloped such that a rear portion of the first supporting member is lowered. FIG. 10 is a schematic view showing a state at which a first supporting member of an assembly for supporting a photographing apparatus according to an exemplary embodiment is sloped such that a front portion of the first supporting member is lowered.

The operations of the assembly for supporting a photographing apparatus 100 according to an exemplary embodiment, in a case in which the first supporting member 110 is sloped from the reference position such that a rear portion of the first supporting member 110 is lowered, and is thereafter returned to the reference position, will now be described.

To photograph an object located higher than the first supporting member 110, it is necessary to tilt the first supporting member 110 such that a front portion of the first supporting member 110 is lifted and the rear portion of the first supporting member 110 is lowered. To tilt the first supporting member 110, a control unit (not shown) drives the motor 131, and the power transmission unit 132 transmits power of the motor 131 to the rotation shaft 113. As a result, the first supporting member 110 is tilted from the reference position shown in FIG. 8 to a position as shown in FIG. 9.

Figure 9:
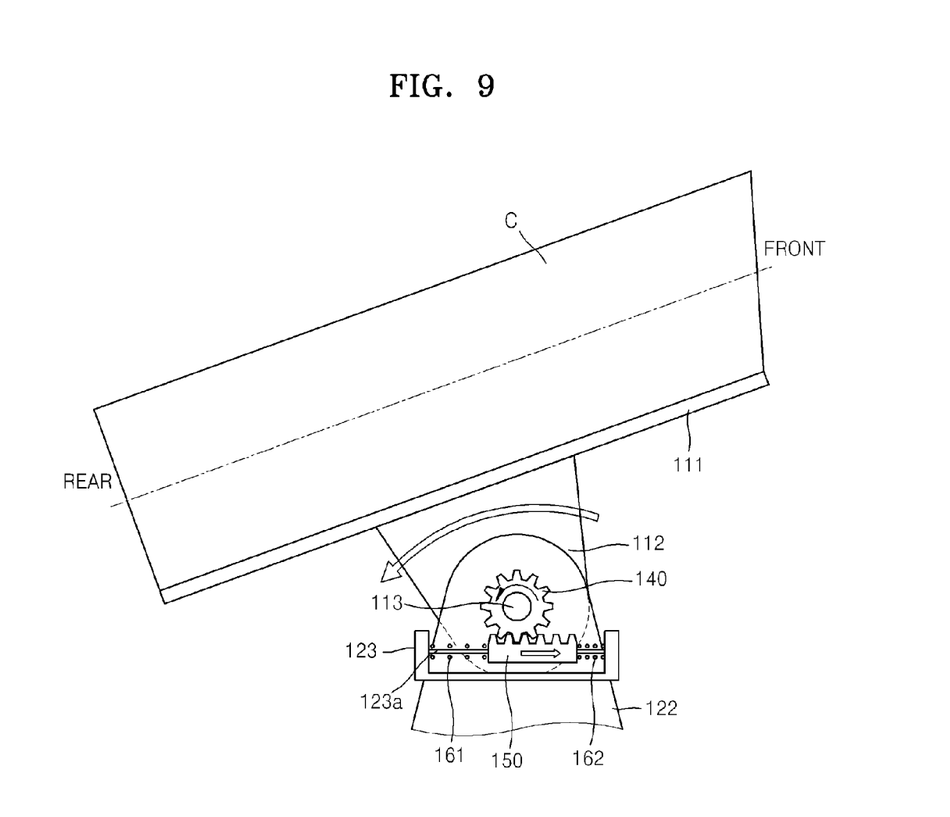
FIG. 9 is a schematic view showing a state at which a first supporting member of an assembly for supporting a photographing apparatus according to an exemplary embodiment is sloped such that a rear portion of the first supporting member is lowered.

In this case, the rotation shaft 113 and the pinion 140 rotate in the counterclockwise direction as shown in FIG. 9, and the rack gear 150 engaged with the pinion 140 moves to the right along the guiding unit 123a. As a result, the second elastic member 162 is compressed and stores an increased amount of elastic energy.

Next, in a case where the first supporting member 110 is to be returned to the reference position, that is, to be tilted from the position shown in FIG. 9 to the position shown in FIG. 8, the control unit drives the motor 131 and rotates the rotation shaft 113 in the clockwise direction. In this case, elastic energy stored in the second elastic member 162 is converted to kinetic energy, and elastic force pushes the rack gear 150 to the left. As a result, the clockwise rotation of the pinion 140 is assisted. In other words, the elastic force applied by the second elastic member 162 at this point assists the driving force of the motor 131, and thus the load on the motor 131 is reduced, and the first supporting member 110 may be easily returned to the reference position. To put it another way, the elastic member 160 (in this instance 162) is positioned to bias the rack gear 150 to move the pinion 140 toward the reference position.

The operations of the assembly for supporting a photographing apparatus 100 according to an exemplary embodiment, in a case in which the first supporting member 110 is sloped from the reference position such that a front portion of the first supporting member 110 is lowered, and is thereafter returned to the reference position, will now be described.

To photograph an object located lower than the first supporting member 110, it is necessary to tilt the first supporting member 110 such that the rear portion of the first supporting member 110 is lifted and the front portion of the first supporting member 110 is lowered. To tilt the first supporting member 110, a control unit (not shown) drives the motor 131, and the power transmission unit 132 transmits power of the motor 131 to the rotation shaft 113. As a result, the first supporting member 110 is tilted from the reference position shown in FIG. 8 to a position shown in FIG. 10.

Figure 10:
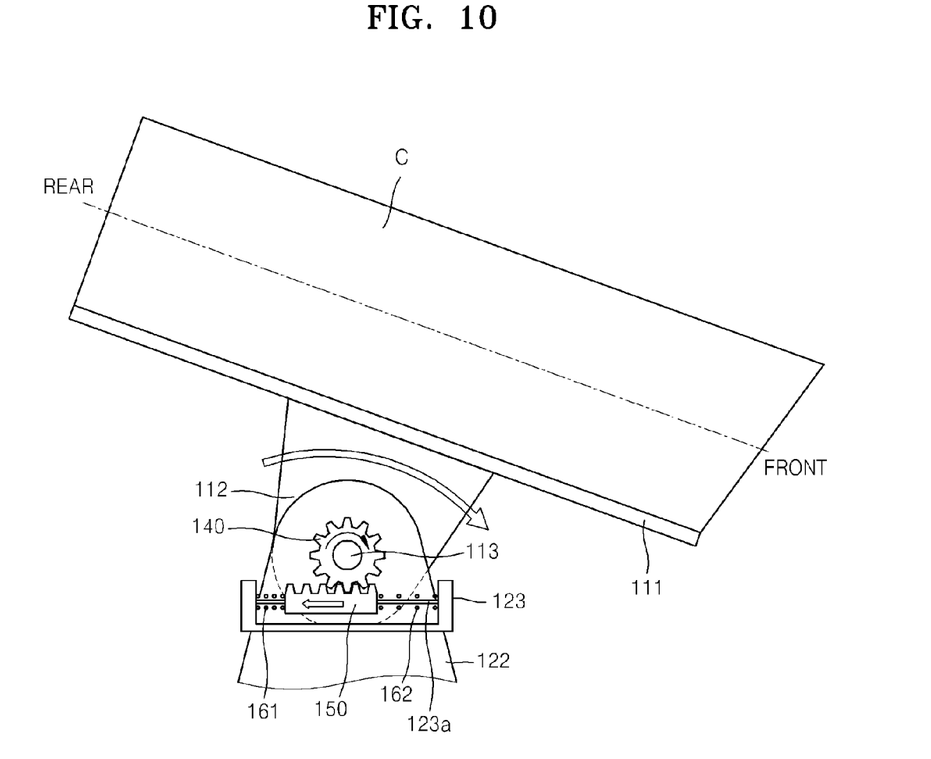
FIG. 10 is a schematic view showing a state at which a first supporting member of an assembly for supporting a photographing apparatus according to an exemplary embodiment is sloped such that a front portion of the first supporting member is lowered.

In this case, the rotation shaft 113 and the pinion 140 rotate in the clockwise direction as shown in FIG. 10, and the rack gear 150 engaged with the pinion 140 moves to the left along the guiding unit 123a. As a result, the first elastic member 161 is compressed and stores elastic energy.

Next, in a case where the first supporting member 110 is to be returned to the reference position, that is, to be tilted from the position shown in FIG. 10 to the position shown in FIG. 8, the control unit drives motor 131 and rotates the rotation shaft 113 in the counterclockwise direction. In this case, elastic energy stored in the first elastic member 161 is converted to kinetic energy, and the elastic force pushes the rack gear 150 to the right. As a result, the counterclockwise rotation of the pinion 140 is assisted. In other words, the elastic force applied by the first elastic member 161 at this point assists the driving force of the motor 131, and thus the load on the motor 131 is reduced, and the first supporting member 110 may be easily returned to the reference position. In other words, the elastic member 160 (161 in this instance) is positioned to bias the rack gear 150 to move the pinion 140 toward the reference position.

As described above, in the assembly for supporting a photographing apparatus 100 according to the present exemplary embodiment, the load on the motor 131 during a tilting operation may be reduced, and thus the first supporting member 110 may be easily returned to the reference position. Furthermore, since the load on the motor 131 may be reduced as described above, the assembly for supporting a photographing apparatus 100 may employ a smaller motor, and thus the space inside the assembly for supporting a photographing apparatus 100 may be utilized more efficiently.

Furthermore, when a coil spring is used as the elastic member 160 in the assembly for supporting a photographing apparatus 100 according to the present exemplary embodiment, durability of the elastic member 160 is improved, and thus the lifespan of the assembly for supporting a photographing apparatus 100 may be increased.

It will be further understood that, although the storage of elastic energy has been discussed above only in the context of compression of an elastic member, the storage of elastic energy may also be accomplished by the stretching of an elastic member, and such an arrangement is included in the scope and spirit of the invention. Furthermore, the compression of one elastic member contemporaneous with the stretching of another elastic member, to store elastic force, is also within the scope and spirit of the invention.

It should be understood that the exemplary embodiments described herein should be considered in a descriptive sense and not for purposes of limitation. Descriptions of features or aspects within each embodiment should typically be considered as available for other similar features or aspects in other embodiments.

What is claimed is:

1. An assembly for supporting a photographing apparatus, the assembly comprising:
   a first supporting member that is configured to have a photographing apparatus installed thereon, and includes a rotation shaft;
   a second supporting member that supports the first supporting member such that the first supporting member is configured to rotate around the rotation shaft;
   a driving unit that rotates the rotation shaft;
   a pinion that is installed on the rotation shaft and rotates with the rotation shaft;
   a rack gear that is engaged with the pinion and slides in a sliding direction according to the rotation of the pinion; and
   at least one elastic member that applies elastic force to the rack gear in the sliding direction.

2. The assembly of claim 1, wherein the second supporting member is located below the first supporting member.

3. The assembly of claim 1, wherein the rotation shaft is configured to provide a tilting operation.

4. The assembly of claim 1, wherein a sensor bar is installed on the rotation shaft,
   the assembly further comprising a sensor that is configured to sense proximity of the sensor bar and is installed on the second supporting member.

5. The assembly of claim 1, wherein the driving unit comprises:
   a motor; and a power transmission unit that transmits power from the motor to the rotation shaft.

6. The assembly of claim 1, wherein a guiding unit is installed on the second supporting member, and
a guiding hole into which the guiding unit is inserted is formed in the rack gear.

7. The assembly of claim 6, wherein the elastic member is disposed on the guiding unit.

8. The assembly of claim 6, where the rack gear, the guiding unit, and the elastic member are assembled as a module.

9. The assembly of claim 1, wherein the elastic member comprises first and second elastic members that are arranged with the rack gear interposed therebetween.

10. The assembly of claim 9, wherein the first and second elastic members have different lengths.

11. The assembly of claim 9, wherein each of the first and second elastic members comprises a coil spring.

12. The assembly of claim 1, wherein the elastic member comprises a coil spring.

13. A photographing apparatus support assembly comprising:
a first supporting member including a rotation shaft, the rotation shaft having a pinion;
a second supporting member that supports the first supporting member and is rotatably engaged with the first supporting member at the rotation shaft;
a rack gear that is supported by a portion of the second supporting member, and is engaged with the pinion, wherein the rack gear slides in a sliding direction based on rotation of the pinion; and
an elastic member that is positioned to bias the rack gear to move the pinion toward a reference position in the sliding direction.

14. The assembly of claim 13, wherein the second supporting member is located below the first supporting member.

15. The assembly of claim 13, wherein a sensor bar is installed on the rotation shaft, and a sensor sensing the proximity of the sensor bar is supported by the second supporting member.

16. The assembly of claim 13, further comprising a driving unit, the driving unit including a motor and a power transmission unit that transmits power from the motor to the rotation shaft.

17. The assembly of claim 13, wherein a guiding unit is supported by second supporting member, and a guiding hole into which the guiding unit is inserted is formed in the rack gear.

18. The assembly of claim 17, wherein the elastic member is installed on the guiding unit.

19. The assembly of claim 13, wherein the elastic member comprises first and second separate elastic members portions, arranged with the rack gear interposed therebetween.

20. The assembly of claim 13, wherein the elastic member comprises a coil spring.

* * * * *